(12) United States Patent
Kim et al.

(10) Patent No.: US 7,927,727 B2
(45) Date of Patent: Apr. 19, 2011

(54) SECONDARY BATTERY, CAP ASSEMBLY THEREOF AND METHOD OF MOUNTING SAFETY VALVE THEREFOR

(75) Inventors: Yong-Sam Kim, Suwon-si (KR); Ki-Ho Kim, Suwon-si (KR); Jae-Yul Ryu, Suwon-si (KR); Jae-Kyung Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1284 days.

(21) Appl. No.: 11/159,163

(22) Filed: Jun. 23, 2005

(65) Prior Publication Data

US 2005/0287422 A1    Dec. 29, 2005

(30) Foreign Application Priority Data

Jun. 23, 2004  (KR) ................ 10-2004-0047011
Jun. 2, 2005   (KR) ................ 10-2005-0047230

(51) Int. Cl.
*H01M 2/12* (2006.01)
(52) U.S. Cl. ............. 429/56; 429/53; 429/163; 429/175
(58) Field of Classification Search .................. 429/175, 429/82, 56, 53, 163
See application file for complete search history.

(56) References Cited

U.S. PATENT DOCUMENTS

| | | | | |
|---|---|---|---|---|
| 6,159,631 A | * | 12/2000 | Thompson et al. | 429/82 |
| 7,279,250 B2 | * | 10/2007 | Berkowitz et al. | 429/245 |

FOREIGN PATENT DOCUMENTS

| | | | |
|---|---|---|---|
| JP | 11-025935 | | 1/1999 |
| JP | 11-126594 | | 5/1999 |
| JP | 11126594 A | * | 5/1999 |
| JP | 11-219692 | | 8/1999 |
| JP | 2000-223102 | | 8/2000 |
| JP | 2000-311669 | | 11/2000 |
| JP | 2001-052672 | | 2/2001 |
| JP | 2004-281061 | | 10/2004 |
| JP | 2005-259413 | | 9/2005 |
| KR | 10-2000-0014969 | | 3/2000 |
| KR | 1020000014969 A | * | 3/2000 |

* cited by examiner

*Primary Examiner* — Dah-Wei D Yuan
*Assistant Examiner* — Zachary Best
(74) *Attorney, Agent, or Firm* — Robert E. Bushnell, Esq.

(57) ABSTRACT

A secondary battery may be manufactured with an electrode assembly having a positive electrode, a negative electrode, and a separator interposed between the positive electrode and the negative electrode. A container encases the electrode assembly. A hole formed on one end of the container with a stepped configuration that opens with different diameters on opposite sides of a cap plate and a safety valve mounted in the stepped surface of the hole, is configured to rupture and tear open upon occurrence of a predetermined internal battery pressure.

18 Claims, 6 Drawing Sheets

SECONDARY BATTERY, CAP ASSEMBLY THEREOF AND METHOD OF MOUNTING SAFETY VALVE THEREFOR

CLAIM OF PRIORITY

This application makes reference to, incorporates the same herein, and claims all benefits accruing under 35 U.S.C. 119 from an application earlier filed in the Korean Intellectual Property Office on 23 Jun. 2004 and 2 Jun. 2005 and there duly assigned Serial Nos. 10-2004-0047011 and 10-2005-0047230, respectively.

BACKGROUND OF THE INVENTION

1. Field of the Invention

The present invention relates to a secondary battery, and more particularly, to a secondary battery, a cap assembly thereof, and a method for easily mounting a safety valve in a safety cap assembly.

2. Description of the Related Art

Unlike the primary battery, the secondary battery may be recharged. Non-aqueous electrolyte secondary batteries of high energy density have recently been developed as high power secondary batteries. Lower power batteries in which one battery cell is made into a battery pack are used as the power source for various portable electronic devices such as cellular phones, laptop computers, and camcorders. Bulk size batteries which are formed by connecting several to tens of the secondary battery cells serially or parallelly can be adequate to power electric vehicles.

Depending on the external shape, secondary batteries maybe classified into different types, for example, square and cylindrical batteries. The secondary battery includes an electrode assembly (jellyroll) in which a positive plate and a negative plate of a long belt shape, and a separator as an insulator interposed therebetween are spiral-wound, or in which a positive plate, a negative plate and a separator are stacked in a multiple layer structure. The electrode assembly is inserted inside a container, and a cap assembly with external terminals is mounted on the container to form the battery.

The cap assembly of such secondary batteries has not only a gasket which seals the container and the external terminals electrically connected to the plates of the electrode assembly, but also a safety device breaks down at a predetermined pressure to discharge gas and to thereby prevent explosion of the batteries.

Although such secondary batteries have a protection circuit to detect excessive current and to cutoff the current, a gas is generated by chemical reaction inside batteries which raises their internal pressure, and sometime batteries might explode and burn when the batteries do not work normally or when an unexpected reaction of batteries happens.

Japanese laid-open 2000-223102 patent application, Japanese laid-open 11-219692 patent application, and Japanese laid-open 11-25935 disclose opening a pressure relief valve which breaks down at a predetermined pressure that is mounted in the cap plate that closes the container to prevent explosions caused by abnormal operation of the batteries.

I have discovered that such technology has a problem because the manufacture is not easy due to the formation of pressure relief valve during the process of making the cap plate so that the uniform operation performance can not be expected.

That is, the pressure relief valve is conventionally formed as an integral structure with the cap plate because the relief valve is made of the same material as the cap plate and is made at the same time when manufacturing the cap plate. For example, a cap plate made of aluminum and the pressure relief valve integrated with the cap plate are manufactured by several pressurizations using progressive dies.

I have found that such a conventional structure however, is difficult to manufacture because the pressure relief valve has a thin layer which must be manufactured at the same time as the cap plate. In addition, the pressure condition to open the valve is different because the thickness of the manufactured valve is not uniform, and an uniform operational performance can not be expected.

Such problems become especially serious for secondary batteries for hybrid electric vehicles (HEV) because the size of secondary batteries for HEVs is bigger than other batteries due to the requirement for high power and bulk size; accordingly, the thickness of the cap plate becomes thicker.

The manufacturing process becomes more difficult because the cap plate should be integrated with the valve, and cannot provide the characteristics necessary for batteries adequate to provide electrical power for HEVs.

SUMMARY OF THE INVENTION

There is provided a secondary battery which can obtain uniform operation performance and can be easily mounted by improving the safety valve structure of the secondary battery. There are also provided a cap assembly thereof and a method of mounting a safety valve therefore.

A secondary battery manufactured according to the principles of the present invention may have an electrode assembly constructed with a positive electrode, a negative electrode, and a separator interposed between the positive electrode and the negative electrode. A container receives and encases the electrode assembly. The secondary battery has a hole formed in one side of the container by a step process and a safety valve is mounted on the stepped surface of the hole to be opened in response to the occurrences of a predetermined internal pressure.

The hole can be formed in one side of a cap plate that seals the container, and the cap plate may bear a terminal electrically connected to the electrode assembly.

The safety valve may be made of the same material as the cap plate.

The safety valve may have a groove with a thin thickness on the front surface thereof, to be opened at the predetermined pressure.

The stepped surface of the hole can formed on the inner surface of the cap plate.

The secondary battery can further include a fastening member arranged on one side of the safety valve, disposed in the hole, to attach the safety valve.

The safety valve can be positioned close to the stepped surface and the fastening member can be positioned close to one surface of the safety valve.

The fastening member can be positioned close to the stepped surface and the safety valve can be positioned close to one surface of the fastening member.

The fastening member can have a hole in the center to communicate the hole and can be fixed to the cap plate by welding.

The fastening member can be made of the same material as the cap plate.

The electrode assembly is wound in a jelly roll configuration, and the container has a configuration of a square shape, and the secondary battery may be used for motor drive.

Also, a cap assembly of a secondary battery manufactured according to the principles of the present invention may be constructed with a cap plate having a mounting hole formed in step process. A positive terminal and a negative terminal may be mounted in the cap plate and electrically connected to an electrode assembly disposed in a container, and a safety valve may be disposed on the stepped surface of the hole to be mounted in contact with the cap plate.

In addition, a method for mounting a safety valve of a secondary battery according to the principles of the present invention forms a hole with a stepped surface on one side of a cap plate of the secondary battery; disposes the safety valve on the stepped surface of the hole; and attaches the safety valve to the cap plate.

The step of attaching the safety valve to the cap plate may include the steps of positioning the safety valve closely to the stepped surface, attaching a fastening member perforated by a hole corresponding to the hole through the cap plate closely to one surface of the safety valve, and attaching adjoining portions the fastening member and the cap plate by welding.

In the meantime, the step of inventing the safety valve to the cap plate contemplates the steps of attaching the safety valve to one surface of a fastening member perforated by a hole corresponding to the hole through the cap plate to be in a clad state, disposing the safety valve and the fastening member in the hole through the cap plate to enable safety valve to adhere closely against the stepped surface, and welding a portion adjoining the fastening member and the cap plate together.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTIONS

Reference will now be made in detail to the embodiments of the present invention, examples of which are illustrated in the accompanying drawings. The embodiments are described below to explain the present invention by referring to the figures.

Figure 1:
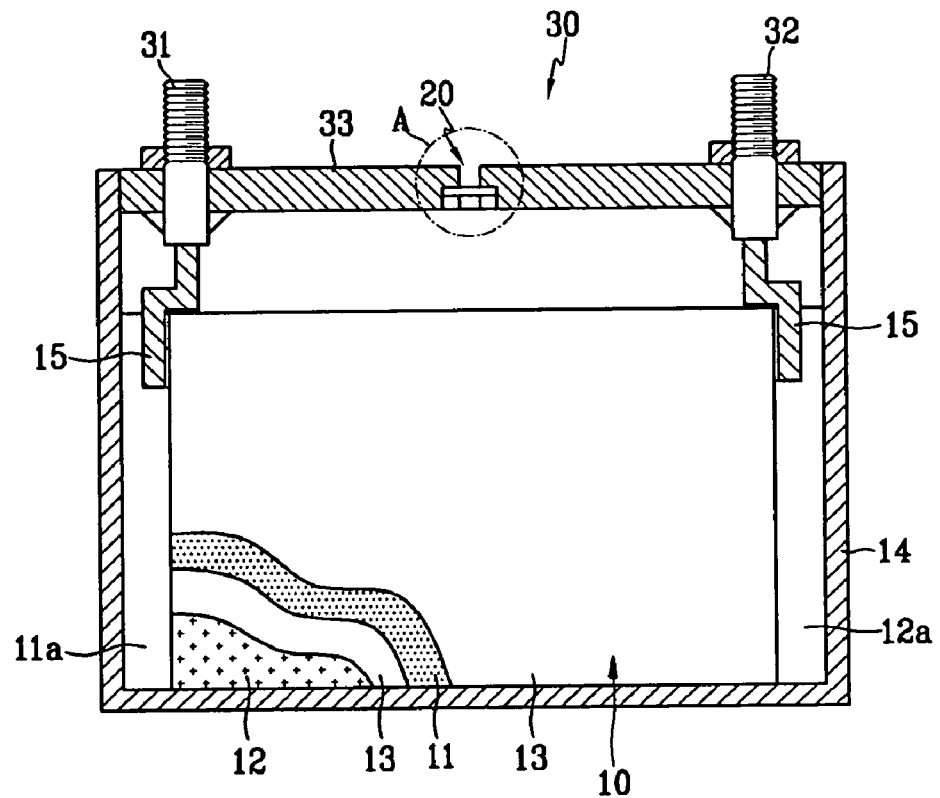
FIG. 1 is cross sectional elevational view of a secondary battery constructed as a first embodiment of the present invention.
Figure 2:
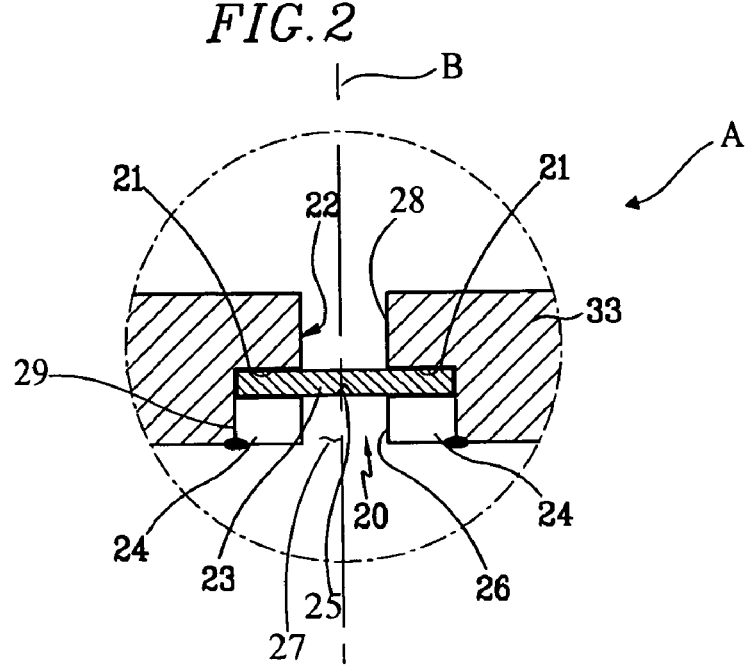
FIG. 2 is a cross sectional detail view of the A area of FIG. 1 for the secondary battery illustrated as the first embodiment of the present invention.

FIG. 1 is a cross sectional view of a secondary battery constructed as a first embodiment of the present invention, and FIG. 2 is a cross sectional detail of the area A of FIG. 1 for the secondary battery illustrated by FIG. 1.

As shown in drawings, the secondary battery may be constructed with an electrode assembly 10 including a positive electrode 11, a negative electrode 12 and a separator 13 interposed between those two electrodes. Container 14 receives the electrode assembly 10 within its interior, and cap assembly 30 is fastened to container 14 in order to plug and seal an open end of container 14. Positive terminal 31 and negative terminal 32 extended outwardly through cap assembly 30 and are electrically connected to the positive and negative plates through taps 15. Safety valve 20 is mounted in cap assembly 30 to exhaust gas generated into the surrounding atmosphere inside container 14 by the battery.

Container 14 is made of an electrically conductive metal such as aluminum, aluminum alloy, and steel plated with nickel, and it has a hexagonal or other shape which provides an inner chamber to receive sufficient large electrode assembly 10.

In the present embodiment, electrode assembly 10 has a jellyroll structure such that the collectors of positive electrode 11 and negative electrode 12 are coated with the corresponding active materials, and separator 13 is placed between electrodes 11, 12 in a stacked layer which is then wound into a jellyroll configuration. A plain, uncoated portion 11a of positive electrode 11 and a plain, uncoated portion 12a of negative electrode are arranged on both opposite ends of electrode assembly 10, and the portions 11a, 12a of the electrode assembly 10 are positioned in the assembly so as to be located on both sides of container 14 in the case that container 14 stands up vertically so that cap assembly 30 is placed in the direction of up and down or is otherwise set in a vertical plane. Uncoated portions 11a, 12a are electrically connected to positive terminal 31 and negative terminal 32 of cap assembly 30 through corresponding taps 15 (or collectors) mounted on respective plain portions 11a, 12a at both ends of electrode assembly 10.

More particularly, cap assembly 30 includes cap plate 33 attached to an upper end of container 14 and fitted with a gasket to maintain a state of insulation. Positive and negative terminals 31, 32 are mounted on both of the opposite sides of cap plate 33 and are electrically connected to plain portions 11a, 12a of electrode assembly 10 through taps 15, respectively. Safety device 20 is positioned in the center of the cap plate 33.

Safety device 20 of the present embodiment is prepared separately from cap assembly 30, and then assembled with cap assembly 30.

Safety device 20 is perforated by a through hole 22 with a stepped surface 21 such as would be characteristic of a counter bore 27 formed in cap plate 33 by a step process, with the stepped surface facing the inside of container 14, a safety valve 23 disposed on stepped surface 21 such as would be created by a counter bore of hole 22, to substantially block or exhaust gas, and fastening member 24 such as a grommet or a washer, inserted into counter bore 27 in a tight fit or alternatively, in a forced fit, adhering closely to safety valve 23 in order to hold safety valve 23 against cap plate 33 and to thereby maintain a state of insulation of safety valve 23 across hole 22.

Accordingly, regardless of the size and the shape of cap plate 33, it allows safety valve 23 to be easily mounted in cap plate 33.

It is preferably that stepped surface 21 formed by the step process and hole 22 have a round shape with sidewalls 28, 29 separated by stepped surface 21, and that fastening member 24 and safety valve 23 disposed on against stepped surface 21 also have a round shape with a size and peripheral shape corresponding to the size and peripheral shape of stepped surface 21.

Preferably, hole 22 is positioned in the center of cap plate 33, considering that the positive and negative terminals 31, 32 are arranged to extend through both opposite sides of cap plate 33.

There is no limitation to the structure and the thickness of hole 22, safety valve 23, or fastening member 24 which form safety device 20, and their individual structures and thicknesses 21 may be varied according to the characteristics of the battery and the internal pressure conditions of the battery.

Safety valve 23 and fastening member 24 are made of the same material as cap plate 33.

In addition, safety valve 23 has a plate structure, and includes groove 25 which creates a local reduction in the thickness of safety valve 23 on the front surface thereof to be easily ruptured or torn upon occurrence of an increase in the battery's internal pressure.

Furthermore, fastening member 24 has a ring shape, and be perforated by through hole 26 that is coaxially aligned with the centerline B of hole 22 in the center. Fastening member 24 is disposed on the stepped surface to be fixed to cap plate 33 as by welding.

As described above, the fastening member 24 can be prepared separately from safety valve 23 and then be mounted on stepped surface 21. Alternatively, fastening member 24 maybe prepared in the clad state by attaching fastening member to one side of safety valve 23 to form an integral body, and that integral body may then be mounted on stepped surface 21 of through hole 22 together with safety valve 23, with fastening member 24 clamping the peripheral area of safety valve 23 against surface 21.

Figure 3:
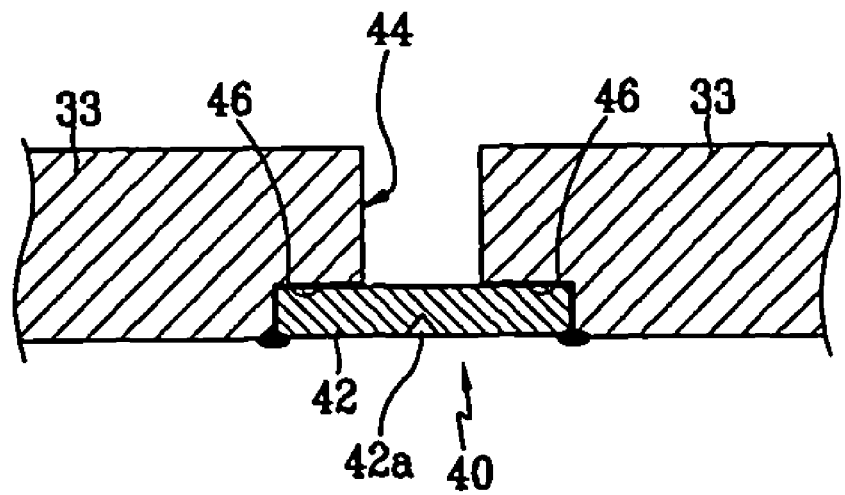
FIG. 3 is a cross sectional view illustrating a detail of the structure of a mounted safety valve of a secondary battery constructed as a second embodiment of the present invention.

FIG. 3 illustrates second embodiment of the present invention, by showing a structure with a separately prepared safety valve 42 that is directly fixed to cap plate 33.

As shown in the drawing, safety device 40 of the present embodiment has a structure created by forming through hole 44 to perforated cap plate 33 in step process, and then inserting safety valve 42 which has been prepared separately from cap plate 33, against stepped surface 46 of hole 44 to be closely adhered, and welding adjoining portions of the peripheries of cap plate 33 and safety valve 42 by laser.

It is preferable that stepped surface 46 of hole 44 formed on cap plate 33 at a depth corresponding the thickness of the safety valve 42 so that the sides of cap plate 33 and safety valve 42 are fresh and lie in the same level when safety valve 42 is disposed in hole 44.

Figure 4:
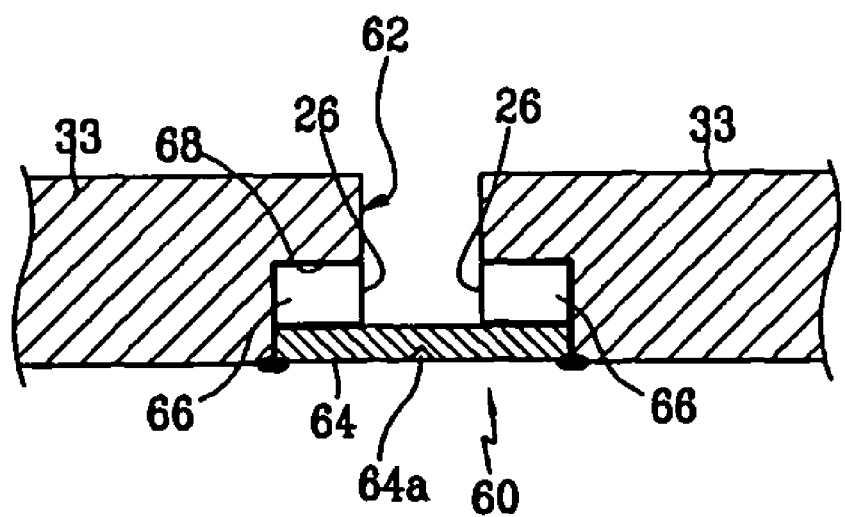
FIG. 4 is a cross sectional view illustrating a detail of the structure of a mounted safety valve of a secondary battery constructed as a third embodiment of the present invention.

FIG. 4 is a schematic cross sectional view of a secondary battery constructed as a third embodiment of the present invention. As shown in FIG. 4, safety device 60 of the present embodiment has a structure that may be fixed in plate by attaching fastening member 66 to one surface of safety valve 64 to be mounted in hole 62 formed in cap plate 33, inserting safety valve 64 and fastening member 66 to be placed on stepped surface 68 of hole 62, and welding adjoining peripheral portion of cap plate 33 and safety valve 64 such as with a laser.

It is preferably that stepped surface 68 formed by the step formation process and hole 62 have a round peripheral shape, and that fastening member 66 and safety valve 64 positioned against stepped surface 68 also have a conforming round peripheral shape with a size and combined thickness corresponding to the size and depth of the stepped surface 68.

Reference numerals 42a and 64a of FIGS. 3 and 4 which are not described above, identify grooves where safety valves 42, 64 are easily ruptured and occurrence of an unsatisfactory increase in the internal pressure of the battery. Grooves 42a, 64a may be formed on a welding surface of safety valves 42, 64 as shown by the drawings, or alternatively, they can be formed on the opposite surface of the welding surface.

Figure 5:
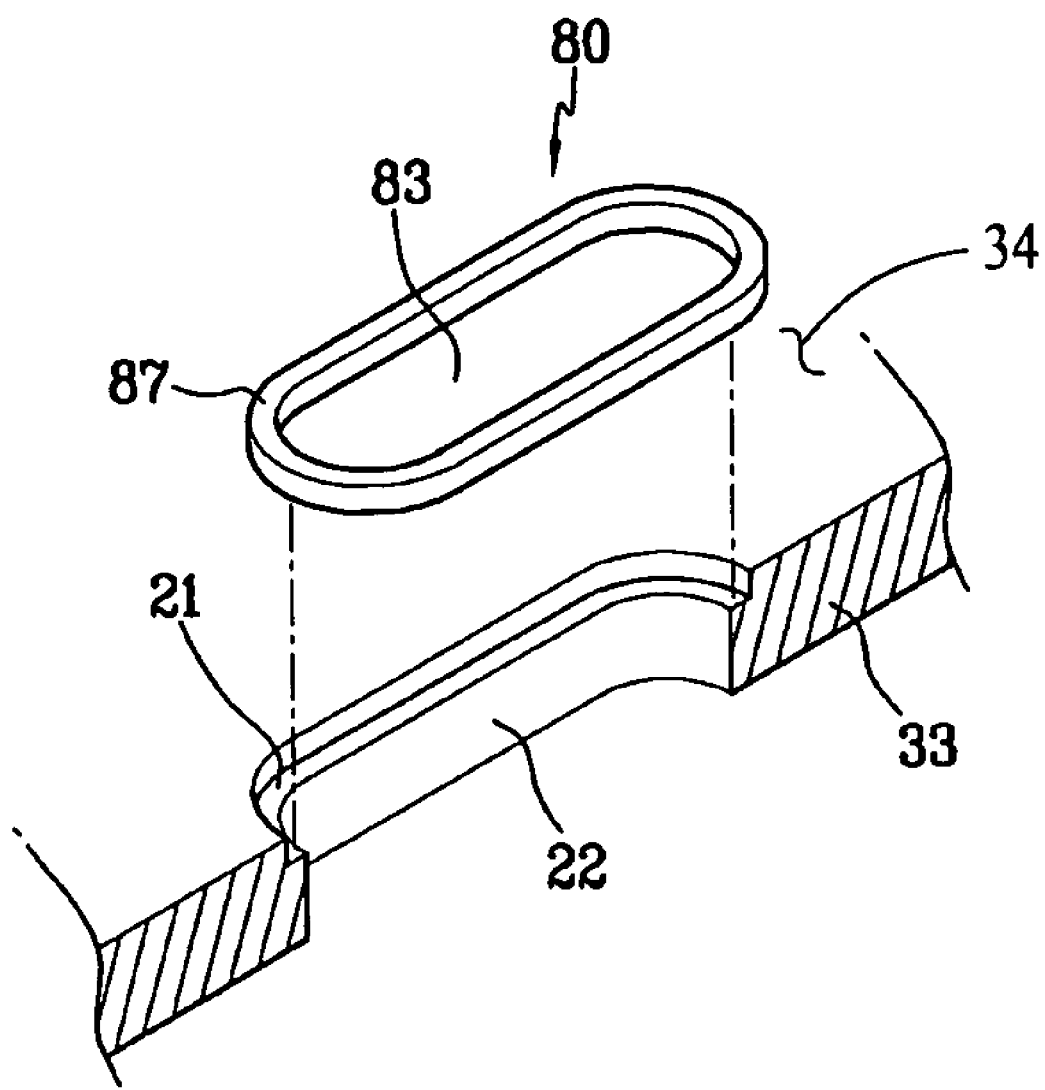
FIG. 5 is a partial exploded view illustrating the structure of a safety valve of a secondary battery constructed as a fourth embodiment of the present invention.
Figure 6:
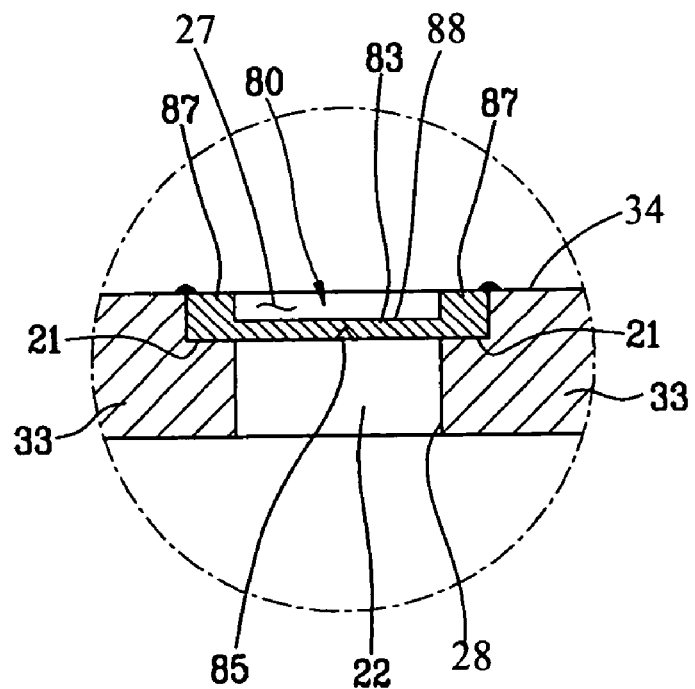
FIG. 6 is a cross sectional view illustrating a detail of the structure of a safety valve of a secondary battery constructed as a fourth embodiment of the present invention.

FIG. 5 and FIG. 6 illustrate the structure of a safety valve constructed as a fourth embodiment of the present invention. In the fourth embodiment, hole 22 is formed to position stepped surface 21 in the outer surface 34 of cap plate 33 which is exposed to the exterior of container 14, and safety valve 83 of safety device 80 is inserted into hole 22, and is attached to cap plate 33 as by welding.

When safety valve 83 is inserted into hole 22, safety valve 83 maintains substantially close contact the stepped surface 21.

Safety valve 83 has a groove 85 which has a thickness that is less than that of the adjoining surface portion 88 of safety valve 83, and which is readily ruptured and torn in response to any increase in the internal pressure of the secondary battery as safety valve 83 described above, and a reinforcement portion 87 such as ring, to be welded to safety valve 83 to form a reinforced peripheral region 87 that is thicker than other portions of safety valve 83.

Safety valve 83 has an approximately an oval shape, and reinforcement portion 87 may be integrally formed along the edge of the safety valve 83.

Safety valve 83 is attached to cap plate 33 by welding (such as laser welding) along a junction between reinforcement portion 87 and the peripheral region of cap plate 33 that has been reinforced by oval shaping ring 87, and since oval shaped reinforcement portion 87 is thicker than other portions of safety valve 83, reinforcement portion 87 can readily absorb, without deformation, the heat generated by welding.

Accordingly, safety valve 83 when constructed as the fourth embodiment may be readily attached to cap plate 33 without defect such as may otherwise occur during manufacture.

Figure 7:
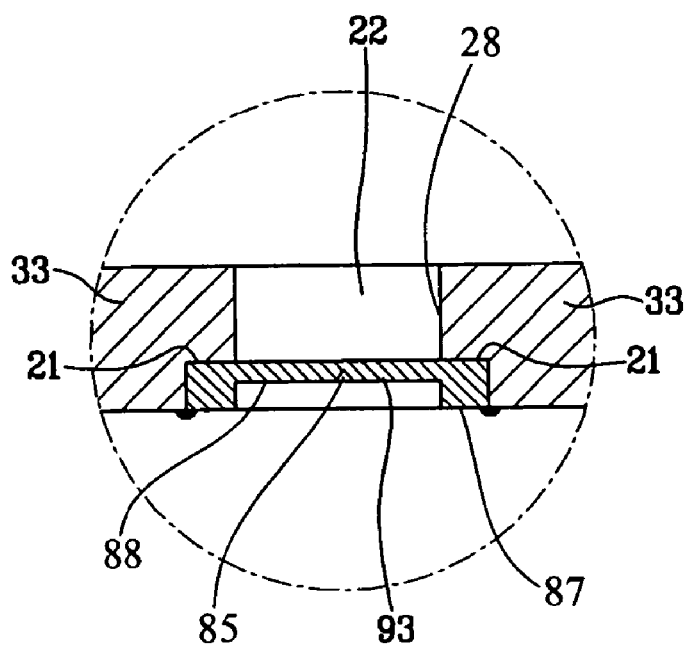
FIG. 7 is a cross-sectional view illustrating a detail of the structure of a safety valve of a secondary battery constructed as a fifth embodiment of the present invention.

FIG. 7 illustrates the structure of a safety valve 93 constructed as a fifth embodiment of the present invention. The structure of safety valve 93 generally has the same structure as safety valve 83 of the fourth embodiment, but safety valve 93 is disposed within the inner surface of cap plate 33, that is, safety valve is located on the inside of container 14 as in the first, second, and third embodiments described above.

In the meantime, FIGS. 8A to 8D are a schematic diagram illustrating one method of mounting a safety valve for a secondary battery in the construction of one embodiment of the present invention. The following describes the structure as an example in which safety valve 23 is connected to cap plate 33 of cap assembly 30 by fastening member 24 as is shown in FIG. 2. Referring FIGS. 8A to 8D collectively, the process for mounting the safety valve in the secondary battery is as described in the following paragraphs.

First, the front surface of cap plate 33 is processed in a step procedure to define through hole 22 opening with different diameters on opposite sides of cap pate 33. Accordingly, cap plate 33 has hole 22 bearing a stepped surface 21 formed by a double step process (See FIG. 8A).

Figure 8A:
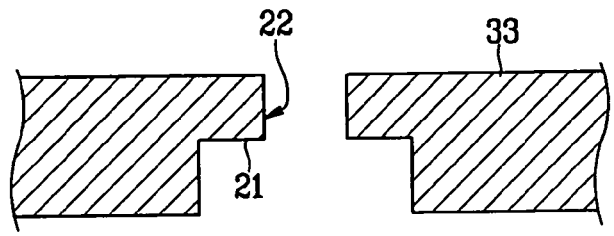
FIGS. 8A, 8B, 8C and 8D are drawings illustrating a sequence of steps in a method for mounting a safety valve of a secondary battery according to one practice of principles of the present invention.
Figure 8B:
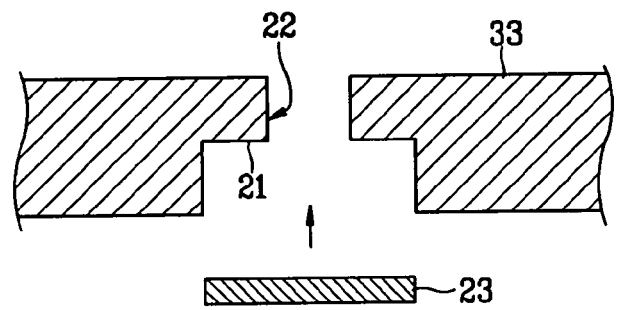

After hole 22 is formed on cap plate 33, safety valve 23, which has been prepared separately from cap plate 33, as shown by FIG. 8B, is disposed on stepped surface 21 of hole 22 so that safety valve is substantially torn or otherwise perforated to discharge gas upon an increase in the internal pressure of the battery.

Then, safety valve 23 can be prepared separately from cap plate 33, safety valve 23 can have various diameters and so as to conform thicknesses to the size of cap plate 33 or to the characteristics of the secondary battery, and to be appropriately employed as a safety feature for the corresponding battery.

Safety valve 23 has a size which corresponds to the size, shape and periphery of stepped surface 21 of hole 22, and is inserted into stepped surface 21 to block hole 22.

Figure 8C:
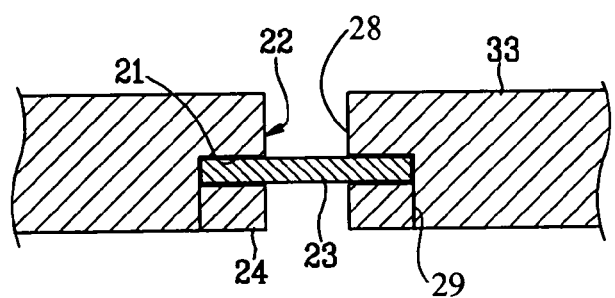

FIG. 8C shows fastening member 24 is inserted toward stepped surface 21 so that fastening member 24 adheres closely to the sidewalls 29 and to lie against safety valve 23 which has been disposed on stepped surface 21. This allows safety valve 23 to be combined between fastening member 24 and stepped surface 21 of cap plate 33 and to thereby maintain a state of insulation.

Figure 8D:
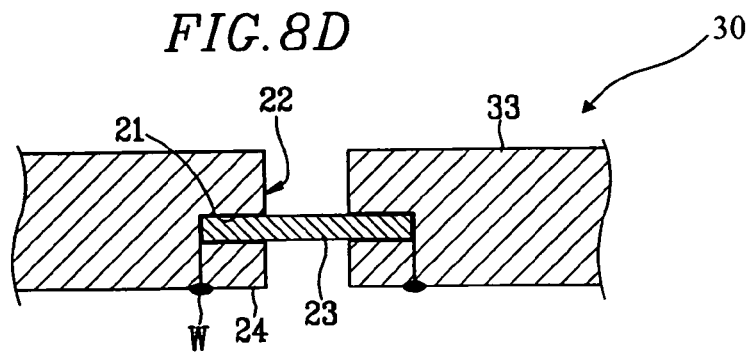

FIG. 8D then shows that a portion W adjoining fastening member 24 and cap plate 33 is welded by supersonic welding, or alternatively, by laser welding, to securely attach fastening member 24 to cap plate 33. This step finally finishes the mounting the safety device.

According to the above process, safety valve 23, although prepared separately from cap assembly 30, may be easily mounted in cap plate 33.

Figure 9:
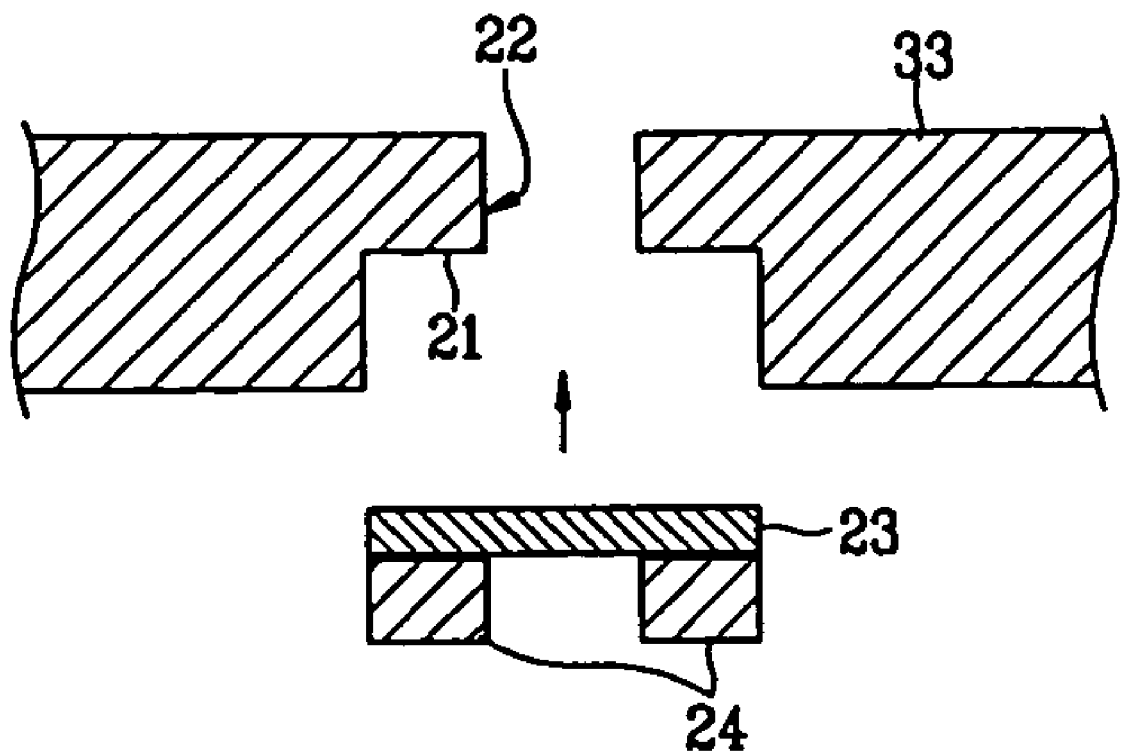
FIG. 9 is a drawing illustrating a method for mounting a safety valve of a secondary battery in practice of another embodiment of the present invention.

Turning now to FIG. 9, if one surface of safety valve 23 is securely attached to fastening member 24 to form an integral body in the clad state, fastening member 24 with the attached safety valve 23 is directly inserted against stepped surface 21 of hole 22, and then, a portion of the peripheral surface adjoining fastening member 24 and cap plate 33 may be welded as by laser welding etc., enabling thereby the safety device to be more simply mounted.

Although embodiments of the secondary battery manufactured in the practice of the present invention can be effectively used as batteries for hybrid electric vehicles (HEV) which require high power, bulk size, and a cap plate which is about 3 mm thick, their use is not limited to only the HEV's. That is, there batteries can also be used as other motor driving batteries for the electric vehicles, motor scooters, motorbikes, and electrically powered appliances such as vacuum cleaners.

According to the principles of the present embodiment, the safety valve can be prepared separately from the cap assembly and then later attached thereto, which enables the safety valve to be easily mounted without regard to the size, shape or thickness of the cap assembly.

In addition, since the separate preparation of the safety valve enables the safety valve to work uniformly, the reliability of the battery is enhanced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery, comprising:
   an electrode assembly having a positive electrode, a negative electrode, and a separator interposed between the positive electrode and the negative electrode;
   a container providing an interior receiving the electrode assembly;
   a cap plate for sealing an open end of the container, the cap plate having a hole, a diameter of the hole on a surface of the cap plate being different from a diameter of the hole on another surface of the cap plate, the hole having a stepped surface between portions of the hole having different diameters;
   a safety valve mounted inside a portion of the hole having a larger diameter of said diameters, the safety valve having a groove formed on a surface of the safety valve facing the interior of the container, the groove formed around a center of the hole, the groove rupturing upon occurrence of an increase of pressure within said interior; and
   a fastening member arranged on one side of the safety valve disposed in the hole to secure the safety valve, the fastening member being disposed on the stepped surface and the safety valve being disposed on the fastening member.

2. The secondary battery of claim 1, wherein the cap plate comprises a terminal electrically connected to the electrode assembly.

3. The secondary battery of claim 2, wherein the safety valve is made of the same material as the cap plate.

4. The secondary battery of claim 2, wherein the hole has a stepped surface between portions of the hole having different diameters.

5. The secondary battery of claim 1, wherein the hole has a stepped surface between portions of the hole having different diameters, the safety valve being disposed on the stepped surface and the fastening member being disposed on the safety valve.

6. The secondary battery of claim 1, wherein the fastening member bears a central aperture communicating with the hole, and the fastening member is attached to the cap plate by welding.

7. The secondary battery of claim 6, wherein the fastening member and the cap plate are made of the same material.

8. The secondary battery of claim 1, wherein the electrode assembly is wound in a jelly roll configuration, and the container has a square shape.

9. The secondary battery of claim 1, wherein the secondary battery provides energy to drive motors.

10. The secondary battery of claim 2, wherein the hole is formed in the center of the cap plate.

11. The secondary battery of claim 1, wherein an edge of the safety valve is thicker than other portions of the safety valve.

12. The secondary battery of claim 11, wherein the safety valve is formed in an outer surface of the cap plate, and the cap plate bears a terminal electrically connected to the electrode assembly.

13. The secondary battery of claim 11, wherein the safety valve is formed in an inner surface of the cap plate, and the cap plate bears a terminal electrically connected to the electrode assembly.

14. A secondary battery comprising:
   an electrode assembly having a positive electrode, a negative electrode, and a separator interposed between the positive electrode and the negative electrode;
   a container accommodating the electrode assembly;
   a cap plate for sealing an open end of the container, the cap plate having a hole, a diameter of the hole on a surface of the cap plate being different from a diameter of the hole on another surface of the cap plate, the hole having a stepped surface between portions of the hole having different diameters; and
   a safety valve and a fastening member integrally attached to the safety valve in a clad state, the safety valve and the fastening member being disposed inside a portion of the hole having a larger diameter of the diameters, the safety valve having a groove formed on a surface of the safety valve facing the interior of the container, the groove formed around a center of the hole, the groove rupturing upon occurrence of an increase of pressure within said interior, the fastening member arranged on one side of the safety valve disposed in the hole to secure the safety valve, the fastening member being disposed on the stepped surface and the safety valve being disposed on the fastening member.

15. The secondary battery of claim 14, wherein the safety valve has a groove formed on a surface of the safety valve facing an inside of the container.

16. A secondary battery comprising:
an electrode assembly having a positive electrode, a negative electrode, and a separator interposed between the positive electrode and the negative electrode;
a container accommodating the electrode assembly;
a cap plate for sealing an open end of the container, the cap plate having a hole, a diameter of the hole on a surface of the cap plate being different from a diameter of the hole on another surface of the cap plate, the hole having a stepped surface between portions of the hole having different diameters; and
a safety valve and a reinforcement portion integrated with the safety valve on a periphery of the safety valve, the safety valve and the reinforcement portion being disposed inside a portion of the hole having a larger diameter of the diameters, the safety valve having a groove formed on a surface of the safety valve facing the interior of the container, the groove formed around a center of the hole, the groove rupturing upon occurrence of an increase of pressure within said interior, a reinforcement portion arranged on one side of the safety valve disposed in the hole to secure the safety valve, the reinforcement portion being disposed on the stepped surface and the safety valve being disposed on the reinforcement portion.

17. The secondary battery of claim 16, wherein the safety valve has a groove formed on a surface of the safety valve facing an inside of the container.

18. The secondary battery of claim 16, wherein the reinforcement portion is welded to the cap plate.

* * * * *